R. VARLEY.
POWER SYSTEM AND APPARATUS.
APPLICATION FILED MAR. 12, 1913.
1,225,532.
Patented May 8, 1917.
2 SHEETS—SHEET 2.
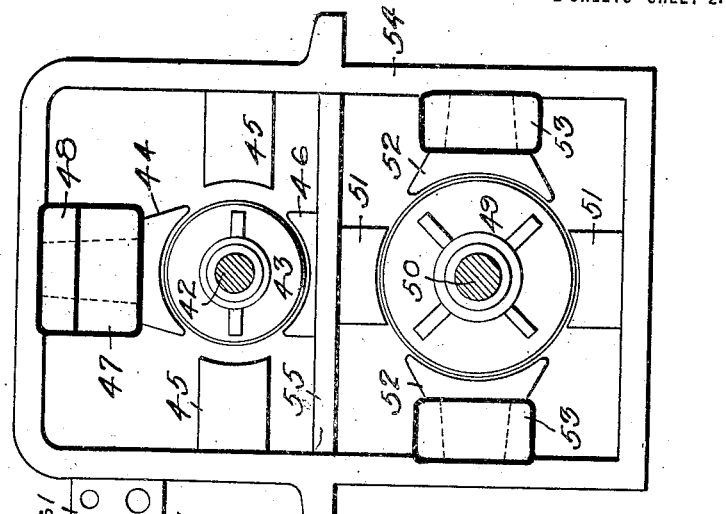
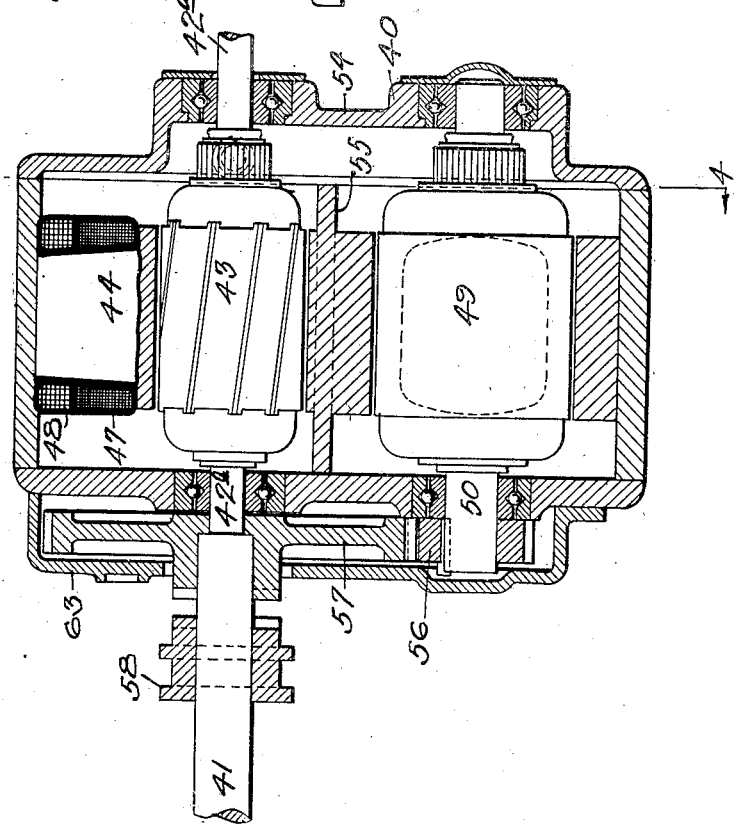
WITNESSES
INVENTOR
Richard Varley
by M. Arthur Reed
his attorney

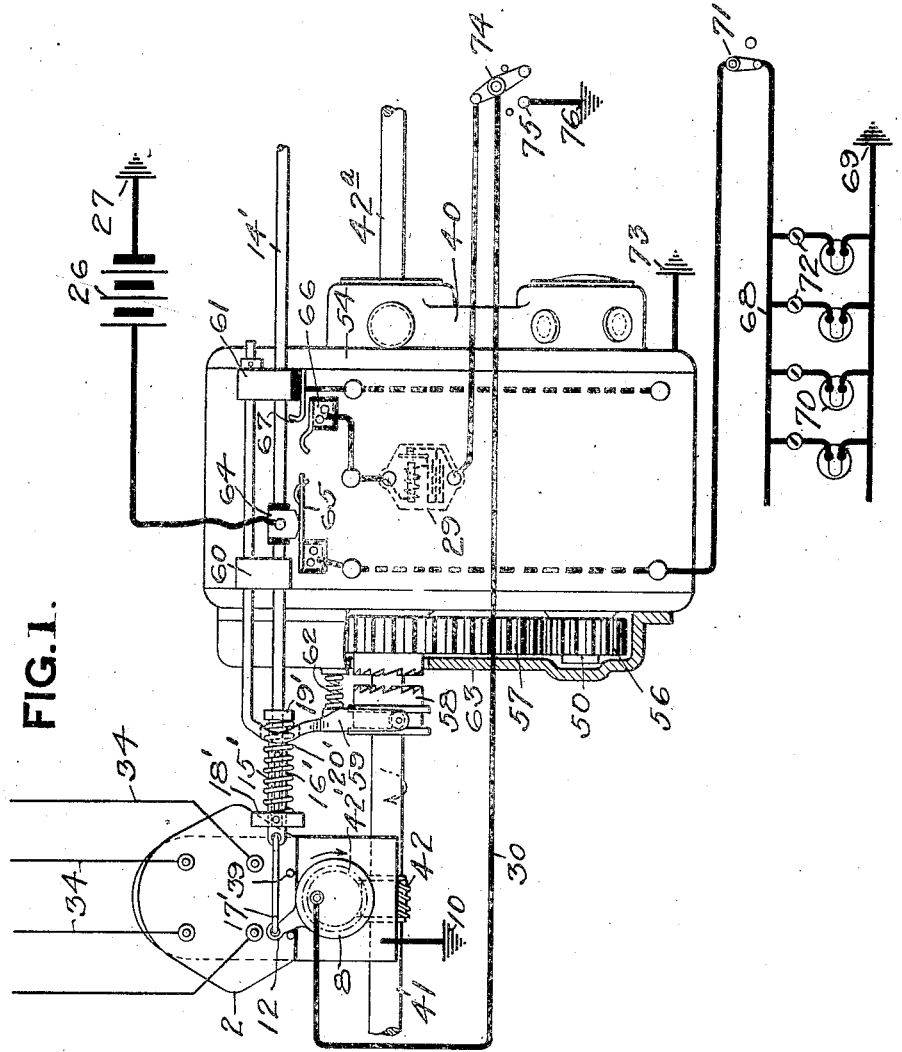

UNITED STATES PATENT OFFICE.

RICHARD VARLEY, OF ENGLEWOOD, NEW JERSEY, ASSIGNOR TO VARLEY DUPLEX MAGNET COMPANY, OF JERSEY CITY, NEW JERSEY, A CORPORATION OF NEW JERSEY.

POWER SYSTEM AND APPARATUS.

1,225,532.  Specification of Letters Patent.  Patented May 8, 1917.

Application filed March 12, 1913.  Serial No. 753,703.

*To all whom it may concern:*

Be it known that I, RICHARD VARLEY, a citizen of the United States of America, residing at Englewood, in the county of Bergen and State of New Jersey, have invented new and useful Improvements in Power Systems and Apparatus, of which the following is a full, clear, and exact description, reference being had to the accompanying drawings, which form part of this specification.

This invention is a new and improved system and apparatus whereby an internal combustion engine of an autovehicle may be started by a motor element and electrical equipment energized by a generator element, both elements being so organized as to form a unit compact in size and symmetrical in form and effective in operation.

I will now describe my invention so that others skilled in the art to which it appertains may understand and construct the same, it being premised, however, that changes may be made in the arrangement shown and described, without departing from my invention.

Figure 1 is a diagrammatic view showing a system and apparatus embodying my invention; Fig. 2 is an enlarged longitudinal vertical sectional view of the starting motor and generator; and Fig. 3 is an elevational view taken on the line 4—4 of Fig. 2, but showing the commutators of the motor and generator in elevation.

In Fig. 1 there is shown a starting and lighting system involving my invention. In this view the numeral 40 indicates a generator and motor unit operatively associated with a shaft 41 which may be connected or geared to the engine in any suitable manner, and by which a magneto 2 may be driven, as through spiral or worm gear 42 carried by the shaft 41 and gear 42 mounted on the magneto armature. The generator and motor may be of any suitable design but, preferably, as shown in Figs. 2 and 3, the generator is a shunt wound machine as described in my Letters Patent No. 1,081,413 dated December 16th, 1913, while the starting motor is preferably of the series wound type.

In Figs. 2 and 3 the armature 43 of the generator element is shown as being carried by the shaft 41, around which armature are disposed pole pieces 44, 45 and 46 forming between them the magnetic field chamber of said armature. To obtain compactness of space the upper pole 44 is elongated and it carries a shunt winding 47 and a series winding 48, while the lower pole 46 is of a shallow nature, which permits close spacing of the armature 43 and a motor armature 49 carried by a shaft 50; the field poles of the motor being indicated by the numerals 51 and 52 which latter poles are the longer ones of the set, carrying the field winding 53, and are disposed laterally so as to operate toward vertical compactness of the general framework 54 which is preferably common to both the generator and motor elements, although, if desired, the generator and motor may each have their own separate frame instead of the single frame shown and in which the pole piece 46 and upper pole 51 are commonly carried by a cross-piece or member 55 thereof.

The shaft 50 of the motor element fixedly carries a pinion 56 meshing with which is a gear 57 normally loosely carried by the shaft 41. As shown in Fig. 2 the gear 57 is preferably provided with a stepped bore so as to fit the shaft 41 and a reduced portion 42ᵃ of the shaft which directly carries the armature 43, to prevent longitudinal shifting of the gear. Keyed to the shaft 41 is a clutch collar 58 longitudinally shiftable into and out of clutch engagement with the gear 57 by means of a shifting yoke 59 slidably mounted as shown in Fig. 1, in suitable bearings 60 and 61 at the side of the frame 54. A coil spring 62 interposed between the yoke 59 and a casing 63 inclosing the gears 56 and 57, normally holds the collar 58 in non-operative or non-clutch engaging position.

As shown in Fig. 2, a shiftable rod 14' also preferably mounted in the bearing pieces 60 and 61, passes through a bore in the shifting yoke 59, and connects by means of a yieldable coupling 15' and link 17' with the shifting arm 12 of the timer casing 8, of the magneto 2. The yieldable coupling 15', comprises a tubular member or sleeve 16 slotted to slidably receive a fastening pin or cotter (not shown) which secures a collar piece 18' to the operating rod 14'. This collar loosely surrounds the sleeve 16' and between said collar and a shoulder 19' on the sleeve is interposed a spring 20'.

The shifting rod or member 14' carries a switch plate or button 64 arranged to be shifted into and out of engagement with switch contact blades 65, 66 and 67, as hereinafter described. The contact switch member 64 connects with the battery 26, and the contact 65 leads to one terminal of the generator series field winding which in turn connects with a light or work circuit 68 grounded at 69, and in which are shown lamps 70 which may be controlled either collectively by a suitable switch 71 or individually by switches 72. The contact blade 67 connects with one terminal of the exciting winding of the motor element while the opposite end of the said motor winding is grounded, as at 73. The live end of the primary winding of the magneto 2 connects through lead 30 and switch 74 with vibrator or trembler coil mechanism 29 and contact 66. The small vibrator coil or trembler apparatus is shown as being desirably disposed or housed within the frame of the generator or motor elements. The switch mechanism 74 may be shifted so as to short circuit the magneto, as through contact button 75 and ground 76, in a well known manner.

It will be apparent, by referring to Fig. 1, that the magneto casing 8 may be shiftably adjusted to obtain spark advance or retard in the usual manner, during driving of the engine. If it is desired to start the engine after it has become idle, the operating rod 14' is shifted so as to bring the shifting arm 12 of the magneto casing 8 to position of full spark retard against the stop 39, and upon continued movement of the rod, under compression of the coupling 15', the switch member or contact 64 may be brought into engagement with contact piece 66. As the magneto is necessarily geared in synchronism with the engine, should the engine be under a compressible charge susceptible of explosion, upon energizing of the ignition circuit, and without initial cranking, the contacts 4 and 6 (see Fig. 1) would be separated, so that engagement of switch member 64 with contact piece 66 will establish a circuit from battery 26 through vibrator 29, lead 30, magneto winding 5, and ground 10 of the magneto, back to the battery for operative energizing of the magneto from the battery, and for explosion of the combustible charge in the cylinders of the engine. If the condition of the engine is such that it must be turned over or initially driven for intake of live gas charges, the rod 14' may be advanced still farther so as to bring the contact 64 into engagement with contact 67, upon doing which current will flow from the battery 26 through the motor winding to ground 73 and ground 27 back to battery thereby energizing the motor. Such movement of the rod 14' will also bring the collar 18' carried by the rod into shiftable engagement with the yoke 59, bringing the clutch member 58 into clutch engagement with the gear 57 as the motor circuit is completed. Energizing of the motor sets up driving of the shaft 41 through the gearing connection above described and driving of the shaft also operates the magneto generator through the gears 42 and 42' so that closing of a circuit through the spark plug or spark plugs, of the engine by the distributer occurs concomitantly with opening or separation of the magneto contacts and resultant completion of a circuit through primary winding thereof and vibrator mechanism 29, and creation of a sparking voltage in the high tension winding of the magneto, the switch contact member 64 remaining in contactual engagement with the contact piece 66 during the motor circuit engagement, above described, with contact member 67. The generator contact member 65 is preferably so disposed that the switch contact 64 passes therefrom as it moves into engagement with either one or both contact members 66 and 67, so that full battery current is available for starting service.

The yieldable coupling 15' or more particularly, the collar 18' and the switch member 64 are so positioned on the operating rod 14' with respect to the shifting yoke and length of travel of the magneto spark adjusting arm 12 that ordinary spark advance or retard adjustability of the magneto casing 8 may obtain without necessarily bringing the battery into circuit with the magneto winding, and the battery ignition circuit through the vibrator mechanism may be completed without bringing the battery into motor starting connection so that where the engine is under a charge capable of being exploded without cranking or turning over of the engine and upon energizating of the ignition circuit, the ignition circuit may be completed without the necessity of operating the motor.

It will be apparent that changes may be made in the construction and the circuit arrangements shown, without departing from my invention. For instance, any suitable switch mechanism may be provided for establishing an ignition circuit through the magneto winding, and the arrangement of the electrical circuits in association with the starting apparatus and generator unit may be varied and controlled by any suitable switch mechanism.

Having thus described my invention, what I claim and desire to secure by Letters Patent is:

1. In apparatus of the character described, the combination with a combustion engine, of a shaft adapted to transmit power to and be driven by the engine, a generator connected to the shaft, a starting motor, a gear loosely carried by the shaft and adapted to be driven by the motor, and clutch means for bringing the gear into engine starting relationship with the shaft.

2. In apparatus of the character described, the combination with a combustion engine, of a shaft adapted to transmit power to and be driven by the engine, a generator connected thereto, a starting motor, a gear loosely carried by the shaft and adapted to be driven by the starting motor, clutch means for bringing the gear into starting relationship with the shaft, and means for normally rendering said gear inoperative, whereby the shaft may actuate the generator without driving the motor.

3. In apparatus of the character described, the combination with a combustion engine, of a shaft adapted to transmit power to and be driven by the engine, a generator connected to the shaft, a starting motor having a shaft paralleling the first shaft, a gear loosely carried by the first shaft, a gear carried by the motor shaft and operatively associated with the first gear, and clutch means for bringing the first gear into starting relationship with the first shaft.

4. In apparatus of the character described, the combination with a combustion engine, of a shaft adapted to transmit power to and be driven by the engine, a generator connected to the shaft, a starting motor, a shaft therefor mounted beside the first shaft, a gear carried by the first shaft, a gear carried by the motor shaft and operatively associated with the first gear, and clutch means for bringing the first gear into starting relationship with the first shaft.

5. In apparatus of the character described, the combination with a combustion engine, of a shaft adapted to transmit power to and be driven by the engine, a generator connected to the shaft, a starting motor, a shaft therefor mounted beside the first shaft, a gear loosely carried by the first shaft, a gear carried by the motor shaft and meshing with the first gear, and clutch means for bringing the first gear into starting relationship with the first shaft.

6. In apparatus of the character described, the combination with a combustion engine, of a shaft adapted to transmit power to and be driven by the engine, an electric unit comprising a frame carrying field poles, a generator armature mounted therein and connected to the shaft, a motor armature therein, a shaft therefor journaled in the casing, a gear carried by the first shaft, a gear carried by the motor and operatively associated with the first gear, and clutch means for bringing the first gear into starting relationship with the first shaft.

7. In apparatus of the character described, the combination with a combustion engine, of a shaft adapted to transmit power to and be driven by the engine, a generator armature connected with the shaft, a motor armature, a frame carrying field poles for inclosing said armatures, a shaft for the motor armature, a gear carried by the first shaft, a gear carried by the motor shaft and operatively associated with the first gear, and clutch means for bringing the first gear into starting relationship with the first shaft.

8. In apparatus of the character described the combination with a combustion engine, of a shaft adapted to transmit power to and be driven by the engine, an electric unit comprising a frame carrying field poles, a generator armature mounted therein and connected to the shaft, a motor armature therein, a shaft therefor mounted beside the first shaft, a gear loosely journaled on the first shaft, a gear carried by the motor and operatively associated with the first shaft, and clutch means for bringing the first gear into and out of starting relationship with the first shaft, whereby the motor may drive the shaft for starting the engine after which the said shaft may drive the generator without driving the gears.

In testimony whereof I have hereunto set my hand.

RICHARD VARLEY.

Witnesses:
MARY A. BARTH,
E. I. BARTH.